United States Patent
Varshney et al.

(10) Patent No.: US 9,369,948 B2
(45) Date of Patent: Jun. 14, 2016

(54) METHOD AND RELATED MOBILE DEVICE FOR CELL SEARCH IN MULTI RADIO ACCESS TECHNOLOGY SYSTEMS

(71) Applicant: Intel Deutschland GmbH, Neubiberg (DE)

(72) Inventors: Deepak Varshney, Dresden (DE); Tianyan Pu, Dresden (DE)

(73) Assignee: Intel Deutschland GmbH, Neubiberg (DE)

( * ) Notice: Subject to any disclaimer, the term of this patent is extended or adjusted under 35 U.S.C. 154(b) by 54 days.

(21) Appl. No.: 13/954,563

(22) Filed: Jul. 30, 2013

(65) Prior Publication Data

US 2015/0038137 A1    Feb. 5, 2015

(51) Int. Cl.
*H04W 4/00* (2009.01)
*H04W 48/16* (2009.01)

(52) U.S. Cl.
CPC ................... *H04W 48/16* (2013.01)

(58) Field of Classification Search
CPC ..... H04W 36/00; H04W 48/18; H04W 48/20; H04W 72/02
See application file for complete search history.

(56) References Cited

U.S. PATENT DOCUMENTS

| 2006/0073802 | A1* | 4/2006 | Chari | H04B 7/0871 455/276.1 |
|---|---|---|---|---|
| 2010/0062764 | A1* | 3/2010 | Aiouaz et al. | 455/434 |
| 2012/0252446 | A1* | 10/2012 | Reial et al. | 455/434 |
| 2014/0018070 | A1* | 1/2014 | Ji et al. | 455/434 |

* cited by examiner

*Primary Examiner* — Vladimir Magloire
*Assistant Examiner* — Shantell L Heiber
(74) *Attorney, Agent, or Firm* — Schwegman Lundberg & Woessner, P.A.

(57) ABSTRACT

In one implementation, a radio is tuned to a frequency and bandwidth such that it can accommodate a plurality of frequency channels of a plurality of RATs. Radio samples are acquired by the radio and stored to an input memory. The RAT specific cell search further includes performing a RAT specific frequency scan on the set of radio samples to detect candidate frequencies for each RAT. Performing the RAT specific frequency scan may comprise dividing the set of radio samples into the plurality of frequency channels for each RAT, sensing the energy for each channel for each RAT, determining a set of frequency channels having highest energy for each RAT and attempting to detect candidate frequencies having highest energy for each RAT.

25 Claims, 4 Drawing Sheets

METHOD AND RELATED MOBILE DEVICE FOR CELL SEARCH IN MULTI RADIO ACCESS TECHNOLOGY SYSTEMS

FIELD OF THE INVENTION

The present disclosure relates to a method and related mobile device for performing a cell search in multi radio access technology systems. The present disclosure specifically relates to a method and related mobile device for performing a cell search in multi radio access technology systems wherein multiple radio access technologies can possibly exist or even coexist on a single radio frequency.

BACKGROUND OF THE INVENTION

In a cellular mobile communication system a mobile device wishing to access a cell must first undertake a cell search procedure. The cell search procedure typically comprises a series of synchronization stages by which the mobile device determines parameters that are necessary to demodulate the downlink and to transmit uplink symbols with correct timing. In multi radio access technology systems the cell search procedure is performed for a plurality of radio access technologies. For example, the multi radio access technology system may comprise GSM (Global System for Mobile communications), WCDMA (Wideband Code Division Multiple Access) and LTE (Long Term Evolution). The mobile device then undertakes the cell search for any radio access technology (RAT) it can operate. Specifically, when the mobile device is switched on, the mobile device has no knowledge of the exact deployment, in particular if it is switched on after traveling to a new location, e.g. after leaving an airplane in another country with different deployment. In order to gain access to a cellular multi RAT network the following steps are typically performed:

For each RAT of a plurality of R RATs
  For each frequency band occupied by a RAT
    S1. For each possible frequency channel of a plurality of N frequency channels:
      a.) Tune the radio to the frequency channel.
      b.) Measure the energy in the frequency channel.
    S2. Sort the channels in descending order and pick P channels having highest energy.
    S3. On these P channels having highest energy, attempt RAT specific cell search.

Sensing the energy is however extremely time-consuming because the radio is tuned for every frequency channel and then energy measurement is performed. Furthermore, in order to achieve statistically stable results and thus avoiding missing cells or false detections, typically stages S1 and S3 have to be repeated multiple times. Denoting the repetition factor by M, and assuming R RATs then the radio has to be tuned R*N*M times. This is a very time consuming process. Furthermore, it is a power consuming process as the radio is power on for a long time. It directly affects user experience, as a user of the system will notice the delay imposed by the cell search when the mobile device attaches to a cell. For the time the mobile device takes to accomplish the cell search procedure no network service will be available to the user.

BRIEF DESCRIPTION OF THE DRAWINGS

Reference will be made to the accompanying drawings, which include the following figures.

DETAILED DESCRIPTION OF THE INVENTION

Figure 1:
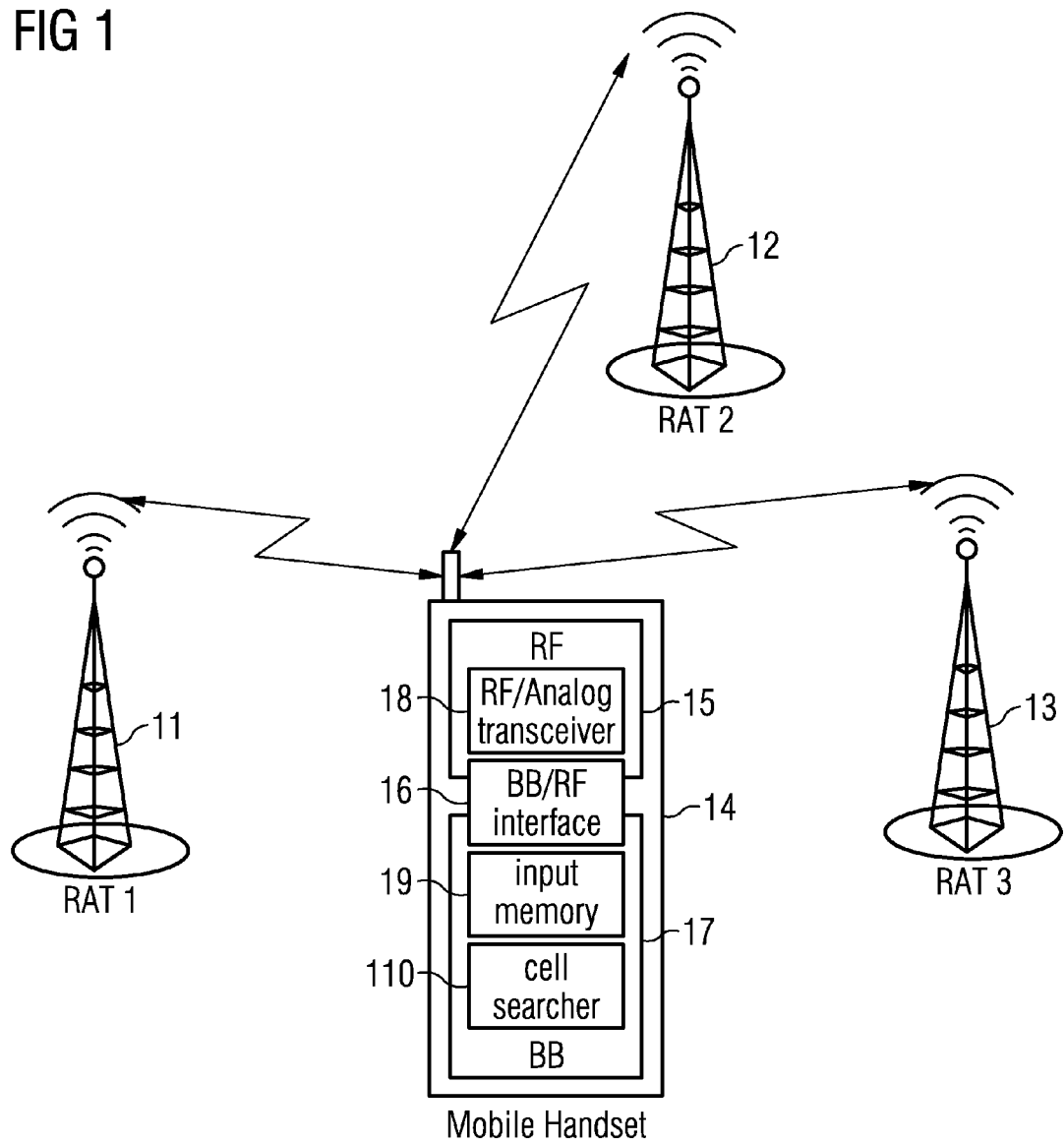
FIG. 1 shows a block diagram of a multi radio access technology system.

The present disclosure relates to a method for performing a cell search in multi RAT systems as shown in FIG. 1. The multi RAT system comprises three base stations 11, 12, 13, wherein the first base 11 station deploys a first RAT, for example LTE, the second base station 12 deploys a second RAT, for example WCDMA, and the third base station 13 deploys a third RAT, for example GSM. When powering up, the mobile device 14 has no knowledge about the deployment of the RATs by the base stations 11, 12, 13. If the mobile device 14 wishes to attach to a cell of a RAT the mobile device 14 has to perform a RAT specific cell search. RAT specific cell search comprises a RAT specific frequency scan and a RAT specific cell scan and is part of the baseband processing performed in the baseband processing module 17, specifically in the cell detection module 110. The mobile device further comprises a radio frequency module 15 including a radio 18 for acquiring radio samples. Radio samples are transferred from the radio frequency (RF) module 15 to the base band (BB) processing module 17 via BB/RF interface 16 to an input memory 19.

Figure 2:
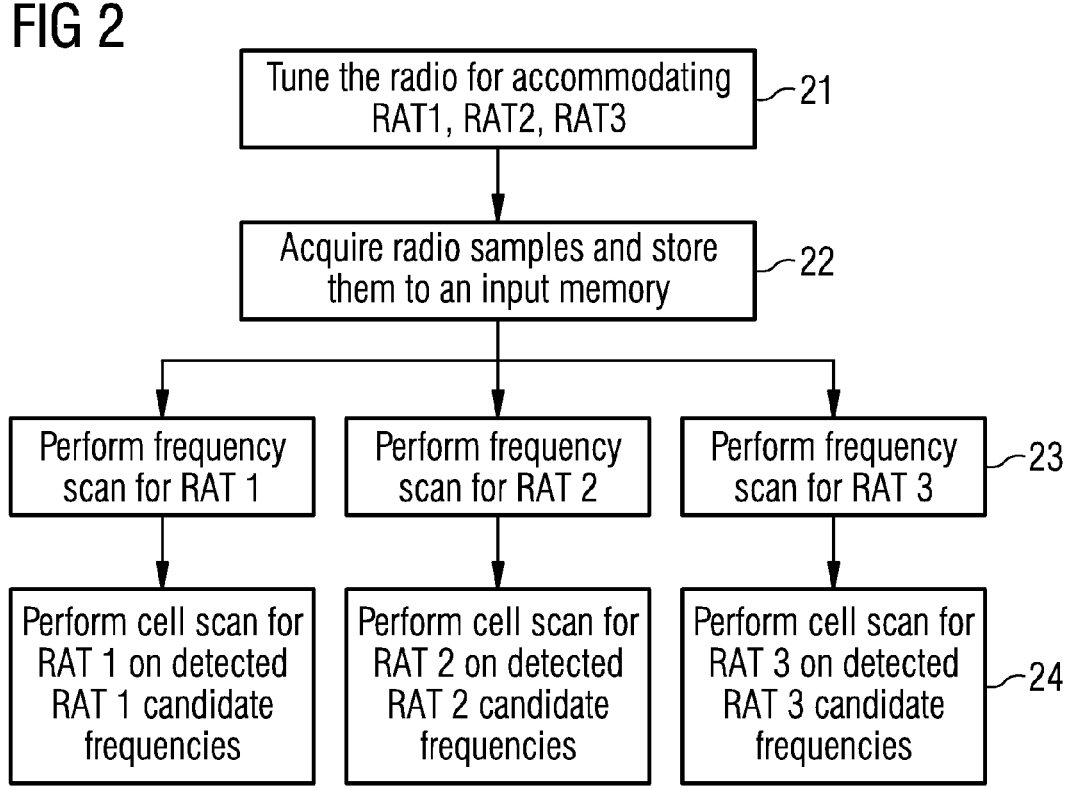
FIG. 2 shows a flow chart of a fast cell search procedure.

Instead of tuning the radio to each frequency channel for sensing the energy of that frequency channel and attempting RAT specific cell search for that frequency channel, according to the method for performing RAT specific cell search as disclosed herein, the radio is tuned to a frequency and bandwidth such that it can accommodate a plurality of frequency channels of a plurality of RATs, see stage 21 of FIG. 2. Then, radio samples are acquired by the radio and stored to an input memory 19 as shown in FIG. 1. Thus, the radio samples may comprise a band possibly used by all RATs. For the input memory 19 most of the on-chip memories, e.g. Hybrid Automatic Repeat reQuest (HARQ) memory, can be used for buffering the radio samples as the mobile device normally does not perform other operations in that time.

The RAT specific cell search further comprises performing a RAT specific frequency scan on the set of radio samples for detecting candidate frequencies for each RAT as shown in stage 23 of FIG. 2. A frequency channel is associated with a candidate frequency of a RAT, for example in LTE there are 692 E-UTRA Absolute Radio Frequency Channel Numbers (EARFCNs) specified which are allocated to frequency bands.

Performing the RAT specific frequency scan may comprise dividing the set of radio samples into the plurality frequency channels for each RAT, sensing the energy for each frequency channel for each RAT, determining a set of frequency channels having highest energy for each RAT and attempting to detect candidate frequencies on the set of channels having highest energy for each RAT. Dividing the set of radio samples into frequency channels can be accomplished by time domain filtering as part of the baseband processing. Sensing the energy can be accomplished by computing the energy of radio samples in a frequency channel.

However, for the frequency scan, determining frequency channels having highest energy may also be done on the basis of reference signal strength indicator (RSSI) or even on more robust metrics for an involved RAT, such as correlation with a primary synchronization sequence for LTE and Primary Scrambling Sequence for WCDMA.

The method for performing a RAT specific cell search further comprises performing a RAT specific cell scan for each RAT on each detected candidate frequency or frequency channel associated with a detected frequency as shown in stage 24. Within the RAT specific cell scan a RAT specific cell search is attempted, possibly using DSP techniques of down-conversion and decimation. This typically requires correlation against specific synchronization patterns, e.g. a sinusoid of 67.7 kHz in GSM, a primary code in WCDMA and three Zadoff Chu sequences for LTE. The associated signal processing can be done in the frequency domain as well. For example, in an OFDM system such as LTE a fast Fourier transform (FFT) implementation is unavoidable. The radio samples can be converted to the frequency domain via the FFT. One benefit of a frequency analysis is that detection of GSM and LTE can be done jointly by frequency domain processing with potentially less complexity and less digital power consumption than time domain filtering, as the FFT may be used for both RATs.

The RAT specific cell scan is preferably completed prior to performing further detection that requires retuning of the radio.

Figure 3:
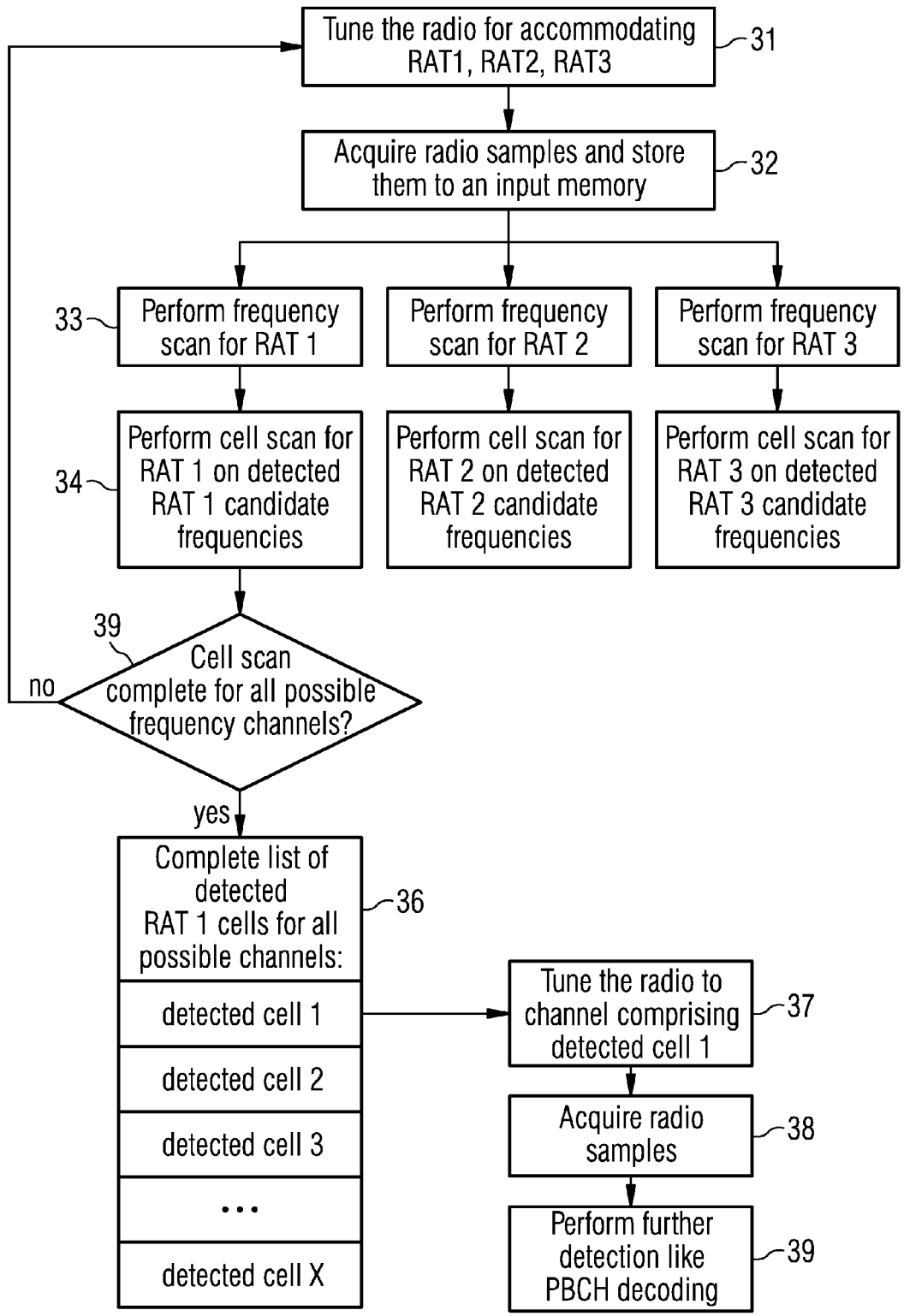
FIG. 3 shows a flow chart of a fast cell search procedure including subsequent detection.

Referring to FIG. 3, when the RAT specific cell scan is complete a complete list 36 of detected cells for each RAT for all possible frequency channels is obtained. Retrieving all parameters of a cell may necessitate performing further detection that requires retuning of the radio such as physical broadcast channel (PBCH) decoding. PBCH decoding typically requires a long RF observation window. However, further detection requiring retuning of the radio is performed only after the cell scan is complete. For example, for detected cell 1 of RAT 1 the radio is tuned to the frequency channel comprising detected cell 1 as shown in stage 37. Then, radio samples are acquired for a sufficient long observation window for performing further detection as shown in stage 38. On the newly acquired radio samples further detection like PBCH decoding is performed as shown in stage 39. Hence, further detection requiring retuning the radio is performed only when the cell scan is complete, thus avoiding retuning of the radio within the cell scan.

However, in case the input memory is not sufficient for storing radio samples of all possible frequency channels of all RATs, then stages 31, 32, 33 and 34 have to be repeated until the list of detected cells is complete as indicated by decision stage 35. Even though in case of insufficient memory retuning 31 and re-acquiring radio samples 32 may be necessary, the speed up and power saving is still significant compared to the prior art, as a retuning of the radio is not performed for every frequency channel that is examined. This improves user experience. It also reduces the power consumption of the RF module 15 as shown in FIG. 1 as the RF activity time is reduced.

Figure 4:
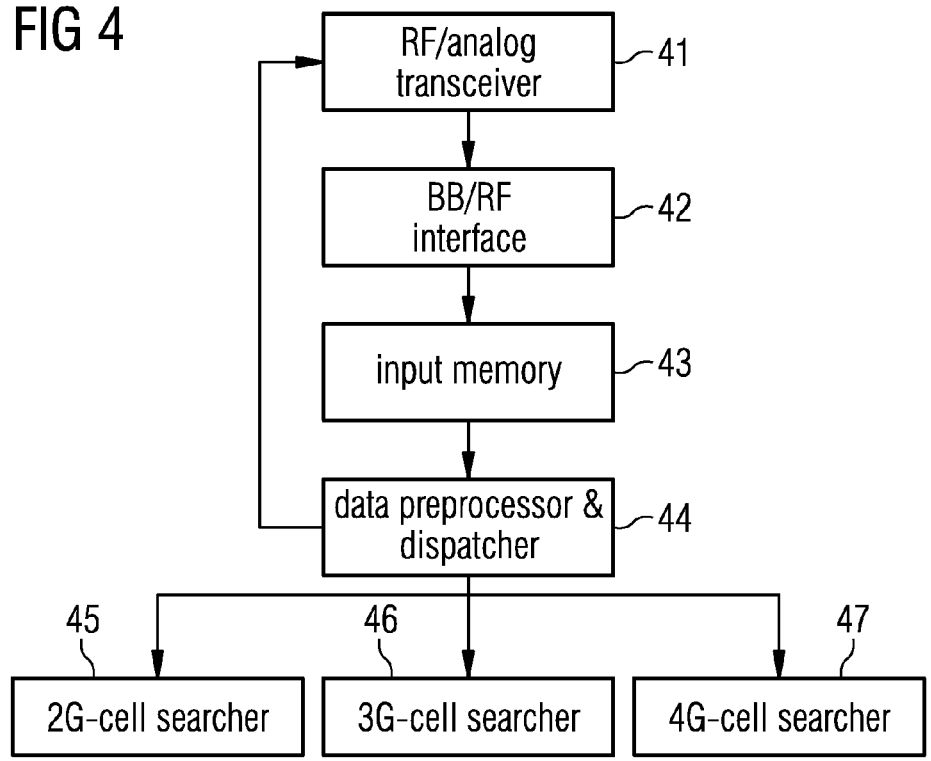
FIG. 4 shows a block diagram for employment of legacy cell search algorithms.

The method for performing a RAT specific cell search may employ legacy cell searchers 45, 46, 47 as shown in FIG. 4. The cell detection module may further comprise a data pre-processor and dispatcher module 44 collecting requirements of the applicable cell searchers 45, 46, 47 about the parameters of the signal contained in the radio samples they need. The data preprocessor and dispatcher module 44 may then combine these requirements and reprograms the RF 41 or the digital filters inside the base band module such that the signal parameters match the requirements of all RATs.

Hence, the pre-processor and dispatcher module 44 may be configured to re-program the radio to the requirements of each radio access technology of the plurality of radio access technologies or to re-program digital filters for performing base band processing to the requirements of each radio access technology of the plurality of radio access technologies.

Specifically, the RF 41 may be programmed to the maximum requirements across all RATs by the data preprocessor and dispatcher module 44. The data preprocessor and dispatcher module 44 may be configured to digitally pre-process the radio samples to the requirements of each RAT. Alternatively, the data preprocessor and dispatcher module 44 may be configured to program the RF 41 to provide a signal that can later be digitally preprocessed, possibly by using scaling, multi-rate filtering, etc. taking into account the requirements across all RATs.

Hence, the pre-processor and dispatcher module 44 may be configured to pre-process the radio samples to the requirement of reach radio access technology of the plurality of radio access technologies for obtaining a plurality of sets of pre-processed radio samples, each set of the plurality of sets of pre-processed radio samples corresponding to a radio access technology of the plurality of radio access technologies. The pre-processor and dispatcher module 44 may be configured to provide each set of the plurality of sets of pre-processed radio samples to a legacy cell searcher for performing a corresponding radio access technology specific frequency scan and cell scan.

Thus, the radio samples received from the RF 41 are stored to an input memory 43, digitally pre-processed and then forked to all the legacy cell searchers 45, 45, 47.

The algorithms of any of the legacy cell searchers 45, 46, 47 do not need to be modified as from the perspective of an individual cell searcher it appears as if the individual cell searcher would still control the RF 41 directly. As the cell search is performed in parallel, the search time for the overall cell search reduces by an order that is proportional to the number of RATs that must be searched.

Figure 5:
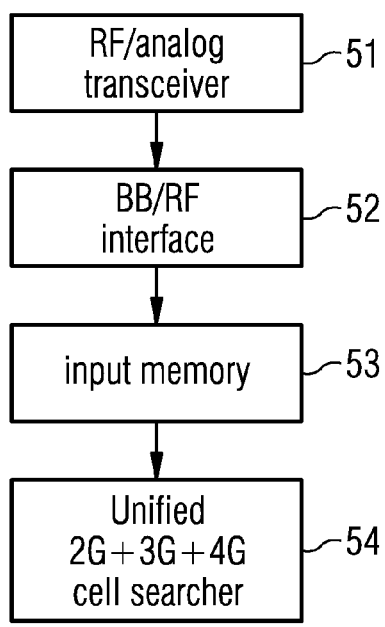
FIG. 5 shows a block diagram for an employment of a unified cell search algorithm.

The method for performing a RAT-specific cell search may employ a unified cell searcher 54 as shown in FIG. 5 which is a single processing entity that receives radio samples from input memory 53 and that runs cell search algorithms in parallel for performing a unified frequency scan and unified cell scan across a number of RATs. The radio samples are acquired by the RF 51 and stored to the input memory 53 via the BB/RF interface 52.

The unified cell searcher 54 may be configured to exploit commonalities between the radio access technology specific frequency scans and the radio access technology specific cell scans to perform the unified frequency scan and the unified cell scan. Thus the overall processing requirement is reduced.

The present disclosure relates further to a computer readable medium having computer-executable instructions for performing the method for performing RAT specific cell search as disclosed herein.

The method for performing a RAT specific cell search as disclosed herein achieves a significant speed-up compared to prior art methods as the time and energy consuming radio tuning is significantly reduced to once while the energy measurement on acquired radio samples can be performed quickly in dedicated digital hardware or a processor.

An application example of the proposed method relates to a multi-RAT terminal or system employing GSM and LTE. A GSM-850 system uses spectrum from 869.2 Mhz to 894.2 Mhz for downlink deployment. However, spectrum from 860 Mhz to 875 Mhz can be used for LTE band 18 downlink deployment. Therefore, there is a common spectrum, i.e. 869.2 Mhz to 875 Mhz in this example, which can be potentially deployed either by GSM or LTE. A fast way for a mobile device to determine the RAT deployed is to try GSM cell scan and LTE cell scan simultaneously as proposed in the present disclosure.

What is claimed is:

1. A method for performing radio access technology specific cell search, the method comprising:
    tuning a radio to a frequency and bandwidth to simultaneously accommodate a plurality of frequency channels of a plurality of radio access technologies, wherein each frequency channel of the plurality of frequency channels is associated with a candidate frequency of a radio access technology of the plurality of radio access technologies;
    acquiring a set of radio samples simultaneously acquired across the plurality of radio access technologies by the radio tuned to the frequency and bandwidth;
    performing a radio access technology specific frequency scan on the set of radio samples to detect candidate frequencies of each radio access technology of the plurality of access technologies;
    performing a radio access technology specific cell scan on each detected candidate frequency;
    determining whether sufficient memory exists in the radio to store radio samples of all possible frequency channels of all radio access technologies prior to completing the radio access technology specific cell scan on each detected candidate frequency;
    in response to determining that sufficient memory exists, retuning the radio and performing physical broadcast channel (PBCH) decoding for each detected candidate frequency using each associated radio access technology on each associated cell using the stored radio samples; and
    in response to determining that insufficient memory exists:
        retuning the radio and performing physical broadcast channel (PBCH) decoding for each detected candidate frequency using an associated radio access technology on each associated cell using the stored radio samples;
        repeating the retuning and performing the PBCH decoding using a different associated radio access technology until all of the stored radio samples have been used; and
        repeating the tuning, performing the radio access technology specific frequency scan and the radio access technology specific cell scan, retuning, performing the PBCH decoding and repeating until the PBCH has been decoded on each detected candidate frequency using each associated radio access technology on each associated cell.

2. The method according to claim 1, the method comprising:
    completing the radio technology specific cell scan prior to performing further detection that requires retuning of the radio.

3. The method according to claim 1, wherein performing a radio access technology specific frequency scan comprises:
    dividing the set of radio samples into frequency channels of each radio access technology of the plurality of radio access technologies;
    sensing the energy for each frequency channel of the plurality of frequency channels for each radio access technology of the plurality of radio access technologies;
    determining a set of frequency channels having highest energy for each radio access technology of the plurality of radio access technologies; and
    attempting to detect candidate frequencies of the set of frequency channels having highest energy for each radio access technology of the plurality of radio access technologies.

4. The method according to claim 3, wherein dividing the set of radio samples into channels comprises time domain filtering of the set of radio samples.

5. The method according to claim 3, wherein attempting to detect candidate frequencies comprises computing detection metrics and comparing the detection metrics against a threshold.

6. T0he method according to claim 1, wherein performing a radio access technology specific cell scan comprises performing the radio access technology specific cell scan in parallel with respect to the plurality of radio access technologies.

7. The method according to claim 1, wherein completing the radio technology specific cell scan comprises:
    subsequent to performing the radio access technology specific cell scan on each detected candidate frequency, retuning the radio to another frequency and bandwidth to accommodate another plurality of frequency channels of the plurality of radio access technologies;
    acquiring another set of radio samples by the radio;
    performing a radio access technology specific frequency scan on the other set of radio samples to detect other candidate frequencies for each radio access technology of the plurality of radio access technologies; and
    performing a radio access technology specific cell scan on each other detected candidate frequency to detect cells.

8. The method according to claim 1, wherein performing a radio access technology specific frequency scan comprises correlating against specific synchronization patterns.

9. The method according to claim 1, the method comprising:
    transforming the set of radio samples into the frequency domain and performing the radio access technology specific frequency scan and the radio access technology specific cell scan in the frequency domain.

10. The method according to claim 1, the method comprising:
    re-programming the radio to requirements of each radio access technology of the plurality of radio access technologies by using information Obtained during the radio access specific cell scan.

11. The method according to claim 1, the method comprising:
    programming the radio to a maximum requirement across all radio access technologies of the plurality of radio access technologies.

12. The method according to claim 1, the method comprising:
    re-programming digital filters being configured to perform base band processing to the requirements of each radio access technology of the plurality of radio access technologies by using information obtained during the radio access specific cell scan; and
    preprocessing the radio samples to the requirement of reach radio access technology of the plurality of radio access technologies for obtaining a plurality of sets of pre-processed radio samples, each set of the plurality of sets of pre-processed radio samples corresponding to a radio access technology of the plurality of radio access technologies.

13. The method according to claim 1, the method comprising:

re-programming digital filters being configured to perform base band processing to the requirements of each radio access technology of the plurality of radio access technologies by using information obtained during the radio access specific cell scan; and providing each set of the plurality of sets of pre-processed radio samples for performing a corresponding radio access technology specific frequency scan and cell scan.

14. The method according to claim 1, the method comprising:

performing a unified frequency scan and unified cell scan across a number of radio access technologies of the plurality of radio access technologies.

15. A mobile device comprising a radio and a cell detection module, the radio configured to tune for a frequency and bandwidth to simultaneously accommodate a plurality of frequency channels of a plurality of radio access technologies, wherein each frequency channel of the plurality of frequency channels is associated with a candidate frequency of a radio access technology of the plurality of radio access technologies; the radio further configured to acquire a set of radio samples simultaneously acquired across the plurality of radio access technologies when tuned to the frequency and bandwidth;

the cell detection module configured to perform a radio access technology specific frequency scan on the set of radio samples to detect candidate frequencies for each radio access technology of the plurality of access technologies;

the cell detection module configured to perform a radio access technology specific cell scan on each detected candidate frequency to detect cells;

the cell detection module configured to determine whether sufficient memory exists in the radio to store radio samples of all possible frequency channels of all radio access technologies prior to completion of the radio access technology specific cell scan on each detected candidate frequency;

in response to a determination that sufficient memory exists, the cell detection module configured to retune the radio and decode a physical broadcast channel (PBCH) for each detected candidate frequency using each associated radio access technology on each associated cell using the stored radio samples; and in response to a determination that insufficient memory exists, the cell detection module configured to:

retune the radio and decode the physical broadcast channel CPBCH) for each detected candidate frequency using an associated radio access technology on each associated cell using the stored radio samples:

repeat the retune of the radio and the decode of the PBCH using a different associated radio access technology until all of the stored radio samples have been used; and continue to repeat the tune of the radio, the scan of the radio access technology specific frequency and cell, the retune of the radio, and the decode of the PBCH until the PBCH has been decoded on each detected candidate frequency using each associated radio access technology on each associated cell.

16. The mobile device according to claim 15, wherein the cell detection module comprises a filter, the filter configured to divide the set of radio samples into the plurality of frequency channels for each radio access technology of the plurality of radio access technologies;

the cell detection further configured to sense the energy for each channel of the plurality of channels for each radio access technology of the plurality of radio access technologies;

to determine a set of frequency channels having highest energy for each radio access technology of the plurality of radio access technologies; and to attempt to detect candidate frequencies of the set of frequency channels having highest energy for each radio access technology of the plurality of radio access technologies for performing the radio access technology specific frequency scan.

17. The mobile device according to claim 15, wherein the cell detection module comprises a pre-processor and dispatcher module configured to re-program the radio to the requirements of each radio access technology of the plurality of radio access technologies.

18. The mobile device according to claim 15, wherein the cell detection module comprises a pre-processor and dispatcher module configured to re-program digital filters for performing base band processing to the requirements of each radio access technology of the plurality of radio access technologies.

19. The mobile device according to claim 15, wherein the cell detection module comprises a pre-processor and dispatcher module configured to re-program the radio to the maximum requirement across all radio access technologies of the plurality of radio access technologies.

20. The mobile device according to claim 15, wherein the cell detection module comprises a pre-processor and dispatcher module configured to pre-process the radio samples to the requirement of reach radio access technology of the plurality of radio access technologies for obtaining a plurality of sets of pre-processed radio samples, each set of the plurality of sets of pre-processed radio samples corresponding to a radio access technology of the plurality of radio access technologies.

21. The mobile device according to claim 20, wherein the pre-processor and dispatcher module is configured to provide each set of the plurality of sets of pre-processed radio samples to a legacy cell searcher for performing a corresponding radio access technology specific frequency scan and cell scan.

22. The mobile device according to claim 15, the cell detection module comprising a unified cell searcher being configured to perform a unified frequency scan and a unified cell scan across a number of radio access technologies of the plurality of radio access technologies.

23. The mobile device according to claim 22, the unified cell searcher being configured to use commonalities between each radio access technology specific frequency scan and each radio access technology specific cell scan for performing the unified frequency scan and the unified cell scan.

24. A non-transitory computer readable medium having computer-executable instructions for execution by a mobile device to configure the mobile device to perform a method comprising:

tuning a radio to a frequency and bandwidth to simultaneously accommodate a plurality of frequency channels of a plurality of radio access technologies, wherein each frequency channel of the plurality of frequency channels is associated a candidate frequency of a radio access technology of the plurality of radio access technologies;

acquiring a set of radio samples simultaneously acquired across the plurality of radio access technologies by the radio tuned to the frequency and bandwidth;

performing a radio access technology specific frequency scan on the set of radio samples to detect candidate frequencies of each radio access technology of the plurality of access technologies;
performing a radio access technology specific cell scan on each detected candidate frequency;
determining whether sufficient memo exists in the radio to store radio samples of all possible frequency channels of all radio access technologies prior to completing the radio access technology specific cell scan on each detected candidate frequency;
in response to determining that sufficient memory exists, retuning the radio and performing physical broadcast channel (PBCH) decoding for each detected candidate frequency using each associated radio access technology on each associated cell using the stored radio samples; and
in response to determining that insufficient memory exists:
retuning the radio and performing physical broadcast channel (PBCH) decoding for each detected candidate frequency using an associated radio access technology on each associated cell using the stored radio samples;
repeating the retuning and performing the PBCH decoding using a different associated radio access technology until all of the stored radio samples have been used; and
repeating the tuning, performing the radio access technology specific frequency scan and the radio access technology specific cell scan, retuning, performing the PBCH decoding and repeating until the PBCH has been decoded on each detected candidate frequency using each associated radio access technology on each associated cell.

25. The medium of claim 24, wherein performing a radio access technology specific frequency scan comprises:
dividing the set of radio samples into frequency channels of each radio access technology of the plurality of radio access technologies;
sensing the energy for each frequency channel of the plurality of frequency channels for each radio access technology of the plurality of radio access technologies;
determining a set of frequency channels having highest energy for each radio access technology of the plurality of radio access technologies; and
attempting to detect candidate frequencies of the set of frequency channels having highest energy for each radio access technology of the plurality of radio access technologies,
wherein at least one of:
dividing the set of radio samples into channels comprises time domain filtering of the set of radio samples, and
attempting to detect candidate frequencies comprises computing detection metrics and comparing the detection metrics against a threshold.

* * * * *